United States Patent
Chakraborty et al.

(10) Patent No.: US 10,324,747 B1
(45) Date of Patent: Jun. 18, 2019

(54) DISTRIBUTED CONFIGURATION CHECKING AND TROUBLESHOOTING IN DATA CENTER USING BEST PRACTICES RULES

(71) Applicant: EMC IP Holding Company LLC, Hopkinton, MA (US)

(72) Inventors: Anupam Chakraborty, Bangalore (IN); Tushar Dethe, Bangalore (IN); Subhashish Mallik, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 41 days.

(21) Appl. No.: 15/377,067

(22) Filed: Dec. 13, 2016

(51) Int. Cl.
G06F 9/46 (2006.01)
G06F 9/455 (2018.01)

(52) U.S. Cl.
CPC ........... G06F 9/45558 (2013.01); *G06F 2009/45591* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 2005/0058619 A1* | 3/2005 | Reiners | C14C 9/00 424/78.37 |
| 2013/0036324 A1* | 2/2013 | Nagasawa | H04L 67/32 714/4.11 |
| 2015/0120979 A1* | 4/2015 | Imada | G06F 13/24 710/269 |
| 2017/0269955 A1* | 9/2017 | Hardy | G06F 9/45558 |

* cited by examiner

*Primary Examiner* — Diem K Cao
(74) *Attorney, Agent, or Firm* — Womble Bond Dickinson (US) LLP

(57) ABSTRACT

In one embodiment, for each of the nodes forming a cluster that share a cluster shared volume (CSV), a remote connection is established with an operating system (OS) management interface of an operating system of the node to query and to obtain OS configuration information concerning a VMM hosting one or more virtual machine (VMs) within the node. A remote connection is established with a VMM interface of the VMM of the node to query and to obtain VM information concerning each of the VMs hosted by the VMM in the node. An analysis is performed on the OS configuration information and the VM information in view of a set of management rules. A report is generated based on the analysis, the report including information indicating which of the management rules has been violated.

21 Claims, 7 Drawing Sheets

```
<NMM:00:00P>  @  #ifapp MSHYPERV

<NMM:00:00P>  @  @ SUBSYSTEM="HYPER-V" REQUIRED="yes" DISPLAY="Checking Hyper-V module requirements..."

<NMM:00:00P>  @ cfgchktests:HyperV_Host_Version_Check HYPERV_HOST_OS_VERSION_CHECK  /— 301
="6.0|2|SERVER,6.1|1|SERVER,6.2|0|SERVER"                                          /— 302

<NMM:00:00P>  @ cfgchktests:Check_Service_Status HYPERV_MANAGEMENT_SERVICE_STATUS="vmms"
STATE="Running" MODE="Auto" DSC="Hyper-V Virtual Machine Management" EXEC_COND="HYPERV_ENABLED"

<NMM:00:00P>  @ cfgchktests:Check_HyperV_IntSrvc_Version                            /— 303
HYPERV_INTEGRATION_SERVICE_VERSION_CHECK="All" VER="6.1.7600.16385"

<NMM:00:00P>  @ cfgchktests:HyperV_VM_PassThroughDisk_Checks HYPERV_PASS_THROUGH_DISK_CHECK="All"

<NMM:00:00P>  @ cfgchktests:HyperV_VM_DifferencingDisk_Checks HYPERV_DIFFERENCING_DISK_CHECK="All"

<NMM:00:00P>  @ cfgchktests:HyperV_VM_BackupInProgress_Check
HYPERV_BACKUP_IN_PROGRESS_CHECK="All"

<NMM:00:00P>  @ cfgchktests:HyperV_PowerShell_Installation_Check
HYPERV_POWERSHELL_INSTALLATION_CHECK="All"

<NMM:00:00P>  @ SUBSYSTEM="HYPER-V-GLR" REQUIRED="yes" DISPLAY="Checking Hyper-V module GLR restore
requirements..."

<NMM:00:00P>  @ cfgchktests:HyperV_GLR_Host_Version_Check
HYPERV_GLR_RESTORES_HOST_OS_VERSION_CHECK ="6.1|1|SERVER,6.2|0|SERVER"

<NMM:00:00P>  @  #endifapp
```

DISTRIBUTED CONFIGURATION CHECKING AND TROUBLESHOOTING IN DATA CENTER USING BEST PRACTICES RULES

FIELD OF THE INVENTION

Embodiments of the present invention relate generally to node cluster in a data center. More particularly, embodiments of the invention relate to configuration checking of data center.

BACKGROUND

In today's world most of the application runs on VMs created on a Hypervisor cluster (e.g., HYPER-V™, ESX™, XEN™, etc.). These Hypervisors provide the computation power of a data center. In data center High Availability is ensured by replicating virtual machines between two or more sites (on different geographies). Replication provides high availability of virtual machines and applications running inside it but cannot provide protection from accidental deletion. So data protection is an important activity in data centers.

In a data center, servers such as HYPER-V™ servers and clusters provide the computation power. The servers are joined to create high available clusters. A cluster can be scaled to 64 nodes (e.g., servers) where 8000 virtual machines can be deployed. Data protection is an essential activity in data center. To save an application consistent image of a virtual machine (VM), there is a need to create check points of the VM.

A virtual machine is protected by creating a check point (without pausing the VM) representing a consistency point. The Hypervisor vendors provide functionality or application programming interfaces (APIs) for creating a check point where applications running inside the virtual machine comes to a consistent state. The check point creation of a VM or a set of VMs can fail in a data center for various reasons. Some reasons can be caused by the VMs such as there is no disk space inside the VM and some could be because of storage\network problems of a VM manager or VMM (referred to as a VMM node). It is difficult to check the events, configurations in each VMM node and VMs for troubleshooting in a data center.

BRIEF DESCRIPTION OF THE DRAWINGS

Embodiments of the invention are illustrated by way of example and not limitation in the figures of the accompanying drawings in which like references indicate similar elements.

FIG. 3 is a diagram illustrating an example of a set of management rules according to one embodiment of the invention.

FIG. 4 is a screenshot illustrating an example of an analysis report according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a configuration checker or checker module is configured to collect configuration information and events from each node of a cluster and virtual machines. It uses a set of predetermined best practice rules to detect the deviations from required configuration. This helps in troubleshooting issues in scale-out server deployments in data centers. The configuration checker can be running in any of the node. By collecting the information pertaining the VMMs, VMs, and other information (e.g., processors, memory, operating system) of all of the nodes in the cluster, an analysis can be performed in a more comprehensive manner.

In one embodiment, for each of the nodes forming a cluster that share a cluster shared volume (CSV), a remote connection is established with an operating system (OS) management interface of an operating system of the node to query and to obtain OS configuration information concerning a VMM hosting one or more virtual machine (VMs) within the node. A remote connection is established with a VMM interface of the VMM of the node to query and to obtain VM information concerning each of the VMs hosted by the VMM in the node. An analysis is performed on the OS configuration information and the VM information in view of a set of management rules. A report is generated based on the analysis, the report including information indicating which of the management rules has been violated.

Figure 1A:
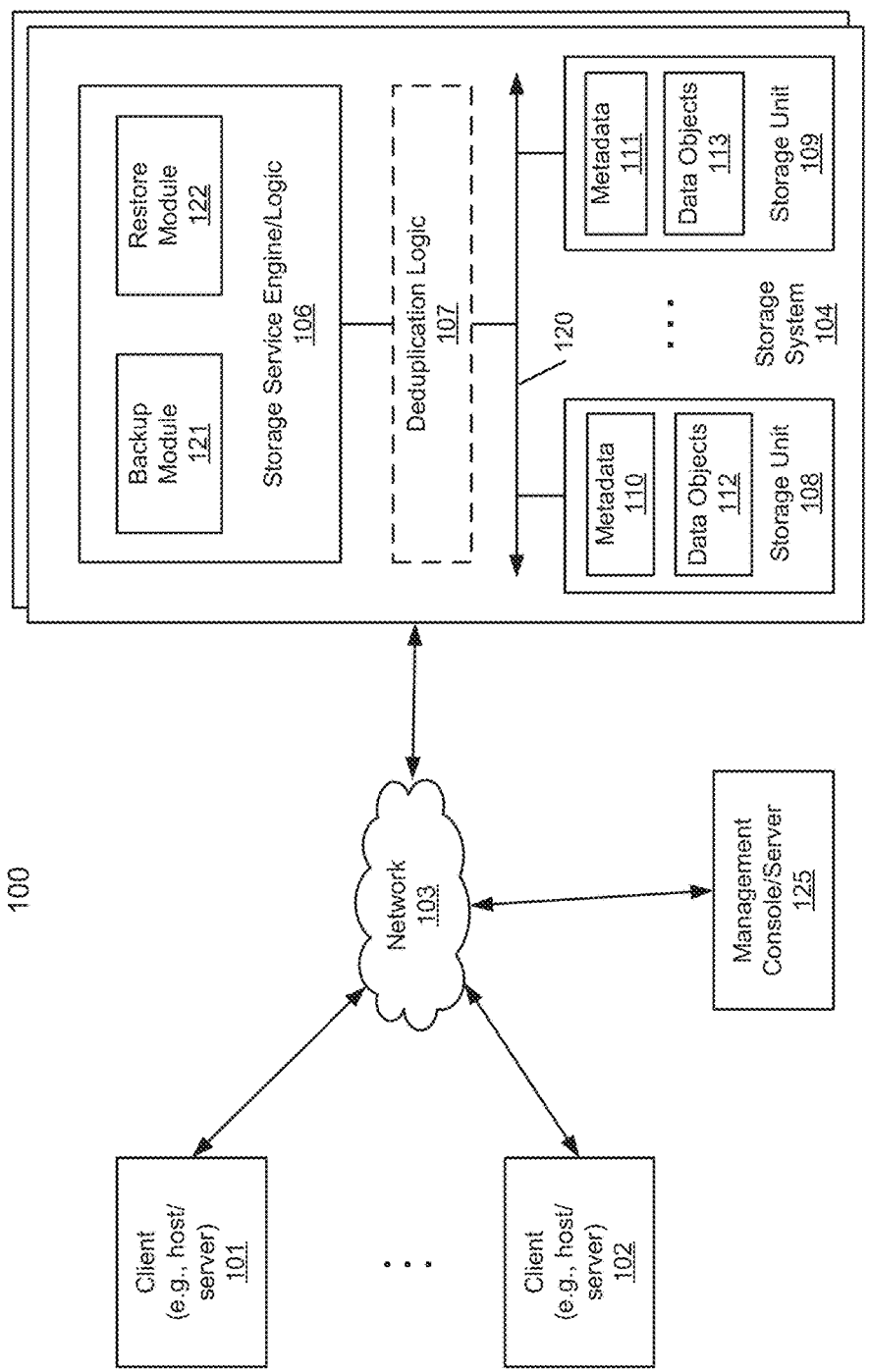
FIG. 1A is a block diagram illustrating a storage system according to one embodiment of the invention.

FIG. 1A is a block diagram illustrating a storage system according to one embodiment of the invention. Referring to FIG. 1A, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 125 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Note that each of clients 101-102 may represent a primary storage system that provides primary storage services to its clients, while storage system 104 represents a backup or replication storage system that provides backup services to clients 101-102. Each of clients 101-102 may have the same or similar architecture or components as of storage system 104 including, for example, storage service engine/logic 106 and deduplication engine/logic 106.

In one embodiment, any of clients 101-102 and storage system 104 may be implemented as one of the nodes configured in a cluster sharing a CSV of a storage device or storage devices. Each node hosting one or more VMs providing storage services to clients as described above. For example, clients 101-102 may be storage nodes of a cluster that provide storage services to their respective clients over a network, while storage system 104 may be one of the backup storage nodes of a backup cluster that provide backup services to clients 101-102. Each of the nodes in a cluster includes a number of VMs managed by a respective VMM. Each VM includes a service or process providing the respective services. At least some of the nodes in a cluster share a CSV that stores the files associated with the VMs such as VM disk files.

Figure 1B:
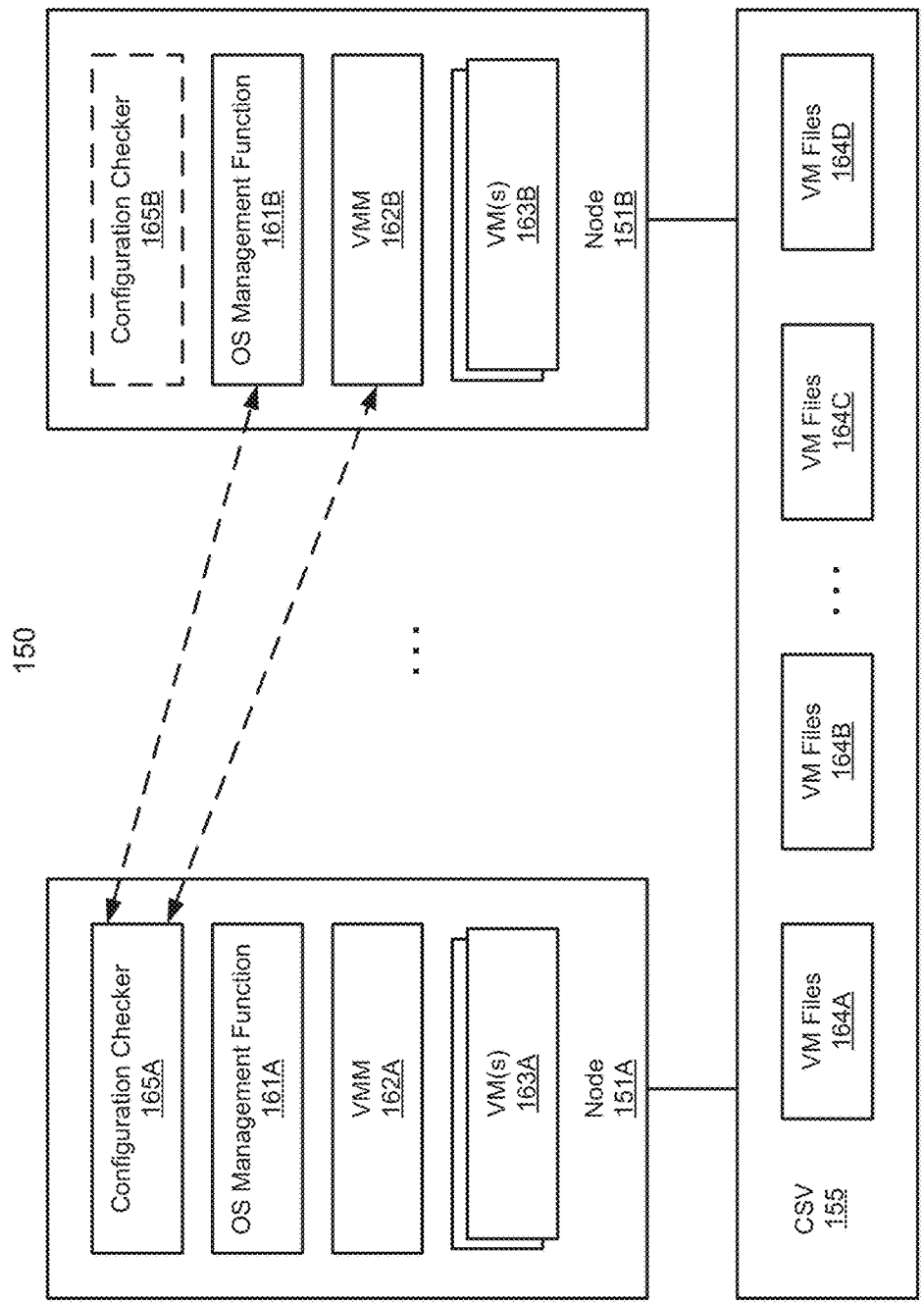
FIG. 1B is a block diagram illustrating an example of a cluster of nodes of a storage system according to one embodiment of the invention.

FIG. 1B is a block diagram illustrating an example of a cluster of nodes of a storage system according to one embodiment of the invention. For example, cluster 150 may represent a cluster associated with clients 101-102 or a cluster associated with storage system 104 of FIG. 1A. Referring to FIG. 1B, cluster 150 includes node 151A-151B. Although there are two nodes as shown, more nodes may be implemented as a part of cluster 150. In one embodiment, each node includes one or more VMs (e.g., VMs 163A-163D) hosted by a respective VMM (e.g., VMMs 162A-162B). Each VM hosts one or more applications or processes that provide services to its client or clients.

A virtual machine is an emulation of a computer system. Virtual machines are based on computer architectures and provide functionality of a physical computer. Their implementations may involve specialized hardware, software, or a combination. A VMM (also referred to as a Hypervisor) is a piece of computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and OS X instances can all run on a single physical machine. This is referred to as a system or full virtualization. This contrasts with operating-system-level virtualization, where all instances (usually called containers) must share a single kernel, though the guest operating systems can differ in user space, such as different Linux distributions with the same kernel.

Referring back to FIG. 1B, each node may further includes an OS management function (e.g., OS management functions 161A-161B) that manages or administers certain management operations of an operating system (e.g., host operating system). In a Windows operating system from Microsoft Corporation, an OS management function may be a WINDOWS MANAGEMENT INSTRUMENTATION™ (WMI). The WMI consists of a set of extensions to the Windows Driver Model that provides an operating system interface through which instrumented components provide information and notification. WMI is Microsoft's implementation of the Web-Based Enterprise Management (WBEM) and Common Information Model (CIM) standards from the Distributed Management Task Force (DMTF). WMI allows scripting languages (such as VBScript or Windows PowerShell) to manage Microsoft Windows personal computers and servers, both locally and remotely.

The purpose of WMI is to define a proprietary set of environment-independent specifications which allow management information to be shared between management applications. WMI prescribes enterprise management standards and related technologies for Windows that work with existing management standards, such as Desktop Management Interface (DMI) and simple network management protocol (SNMP). WMI complements these other standards by providing a uniform model. This model represents the managed environment through which management data from any source can be accessed in a common way.

VMMs 162A-162B may be a HYPER-V™ compatible Hypervisor available from Microsoft Corporation. Hyper-V implements isolation of virtual machines in terms of a partition. A partition is a logical unit of isolation, supported by the hypervisor, in which each guest operating system executes. A hypervisor instance has to have at least one parent partition, running a supported version of Windows Server. The virtualization stack runs in the parent partition and has direct access to the hardware devices. The parent partition then creates the child partitions which host the guest OSs. A parent partition creates child partitions using the hypercall API, which is the application programming interface exposed by Hyper-V.

Referring back to FIG. 1B, according to one embodiment, a configuration checker, such as configuration checkers 165A-165B, may be deployed in any of nodes 151A-151B to collect configuration information of all the nodes in the cluster, analyze the collected configuration in view of a set of rules, and to generate a report concerning each of the nodes based on the analysis. In one embodiment, configuration checker 165A, in this example, deployed in node 151A, is configured to, for each of the nodes forming a cluster that share a cluster shared volume (CSV), establish a remote connection with an operating system (OS) management interface of an operating system of the node to query and to obtain virtual machine manager (VMM) information concerning a VMM hosting one or more virtual machine (VMs) within the node. The configuration checker further establishes a remote connection with a VMM interface of the VMM of the node to query and to obtain VM information concerning each of the VMs hosted by the VMM in the node. An analysis is performed on the OS configuration information and the VM information in view of a set of management rules. A report is generated based on the analysis. The report includes information indicating which of the management rules has been violated and a recommendation of an action or actions to remedy the violation.

Figure 2:
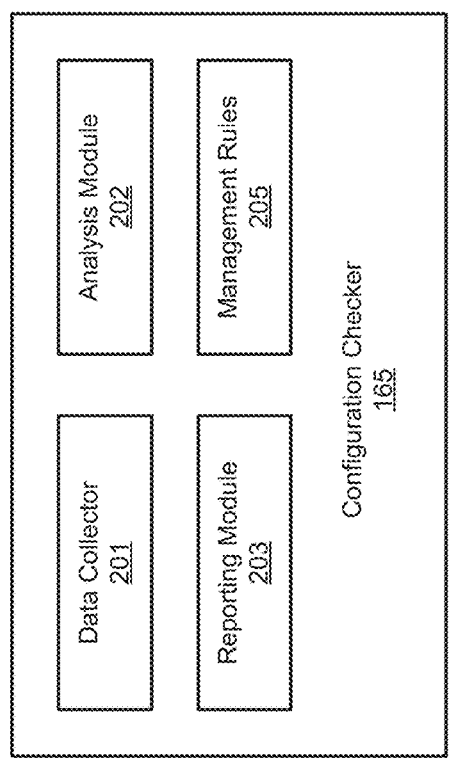
FIG. 2 is a block diagram illustrating an example of a configuration checker according to one embodiment of the invention.

FIG. 2 is a block diagram illustrating an example of a configuration checker according to one embodiment of the invention. Referring to FIGS. 1B and 2, in one embodiment, configuration checker 165 includes data collector 201, analysis module 202, and reporting module 203. Configuration checker 165 further maintains a set of management rules 205, which may be configured by a user or administrator via a configuration interface (not shown). Data collector 201 establishes a remote connection with each of the nodes in a cluster to collect the configuration information about each node.

In this example, it is assumed that configuration checker 165A of node 151A is selected to collect configuration information from the rest of the nodes in the cluster such as node 151B. In one embodiment, data collector 201 establishes a remote connection with OS management function 161B via an OS management interface (e.g., WMI) to obtain OS configuration information. In one embodiment, the OS configuration information includes, but is not limited to, information indicating an operating state of a virtual machine management service (VMMS), an operating state of a volume shadow service (VSS) writer, an operating state of CSV VSS writer, and/or a virtual machine integration service.

In addition, data collector 201 of node 151A establishes a remote connection with VMM 162B to obtain VM information concerning the VMs hosted by VMM 162B. In one embodiment, the VM information includes, but is not limited to, information indicating whether there is any VM that has been configured with a pass through disk, whether a VM shares a differential virtual hard disk with another VM, and/or whether a virtual machine for which a check point creation has failed as it is configured in the root directory of the CSV.

Analysis module 202 performs an analysis on the OS configuration information and the VM information collected from all of the nodes in the cluster in view of rules 205 to determine whether any of the collected information indicates an abnormal operation, i.e., whether any of the rules 205 has been violated. An example of rules 205 is shown in FIG. 3. Based on the analysis, reporting module 203 generates a report indicating whether any of the rules has been violated.

For example, if the rules require that a VMMS must be running in each node and if there is no VMMS running within a node, the node will be reported. If a VSS writer is in a failed or "waiting for completion" state in a node, the node will be reported. If a CSV VSS writer is in a failed or "waiting for completion" state in a node, the node will be reported. If the rules require that all virtual machines should be installed with a particular version of the VM integration service and if there is any VM that does not have the VM integration service installed with the required version, the VM or VMs will be reported. Similarly, based on the rules, any node with the VMs sharing differential virtual hard disk with another VM, such a node will be reported. A VM configured with a pass through disk will be reported. The rules may require that no VHD or configuration file of a VM should be present on the root of the CSV, otherwise the check point creation will fail. If that is the case, the VM or VMs will be reported.

That is, a configuration checker can be deployed in any one of the nodes in the cluster to collect the configuration information of each of the nodes via a remote connection, including OS configuration information and VM information. In this embodiment, a single instance of configuration checker can collect the configuration of all other nodes in the cluster, perform an analysis on the collected configuration information, and generate a report based on the analysis centrally. In a conventional system, the configuration information is collected in each of the node individually, which is inefficient.

Figure 4:
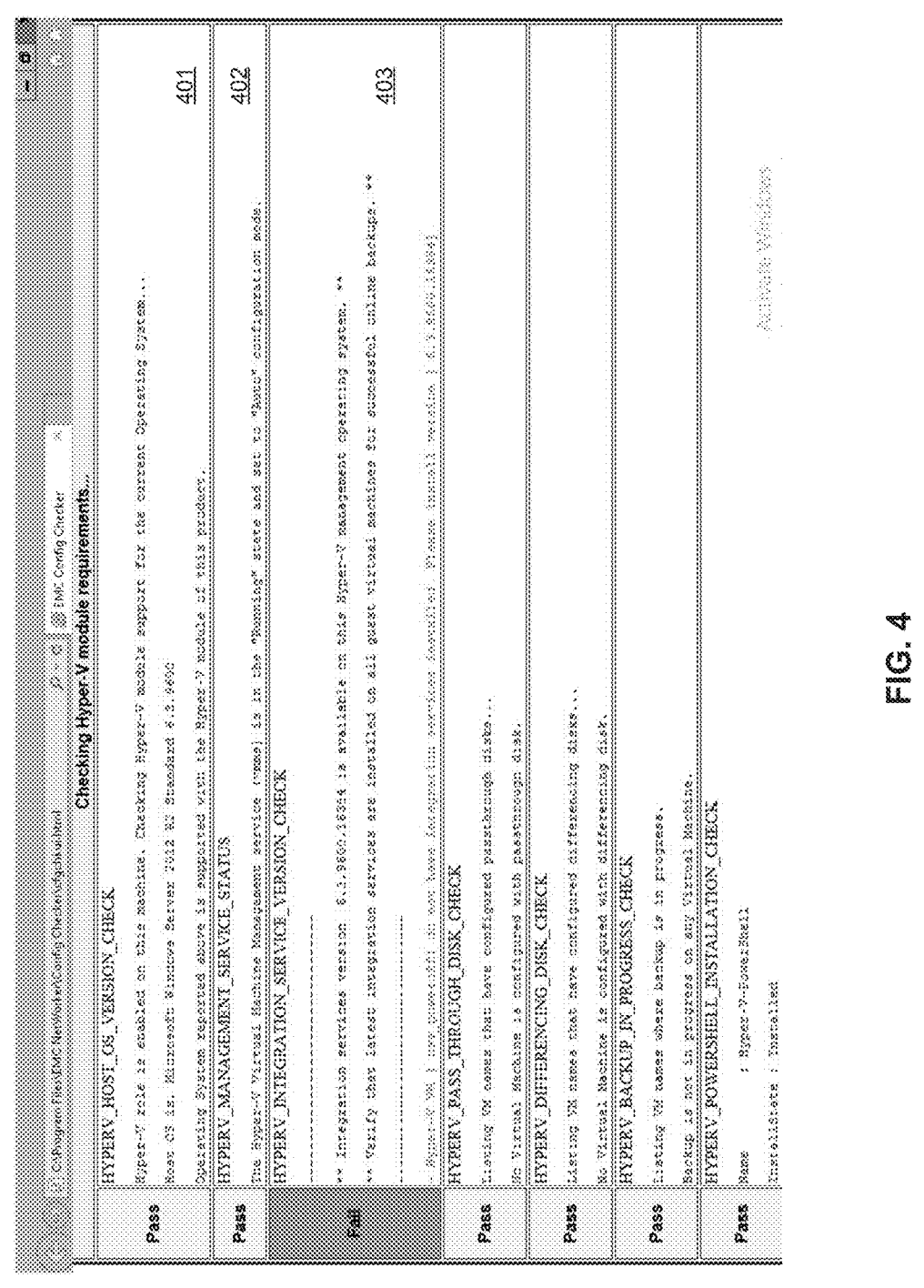

FIG. 4 is a screenshot illustrating an example of a report according to one embodiment of the invention. The report as shown in FIG. 4 may be generated by reporting module 203 based on an analysis performed by analysis module 202 on the configuration information (e.g., OS configuration information and VM information) collected by data collector 201 of FIG. 2. As shown in FIG. 4, one of the rules, i.e., the integration service version, has been violated or failed. The report indicates that such a rule has failed and provides a recommendation to remedy the failure. In this example, the report requests the latest version of integration service to be installed.

Referring to FIGS. 3 and 4, rule 301 requires that a host OS version has to be a certain version or later. Based on the configuration information obtained from a node, report entry 401 indicates that the host OS version of the node is proper in view of rule 301. Similarly, report entry 402 indicates that the VMMS is running in the node, which is required by rule 302. However, report entry 403 indicates that the integration service version is not the latest version required by rule 303. As a result, report entry 403 is flagged as failure because the corresponding rule 303 has been violated. A recommendation of an action, in this example, installation of the required version, is provided in report entry 403.

Figure 5:
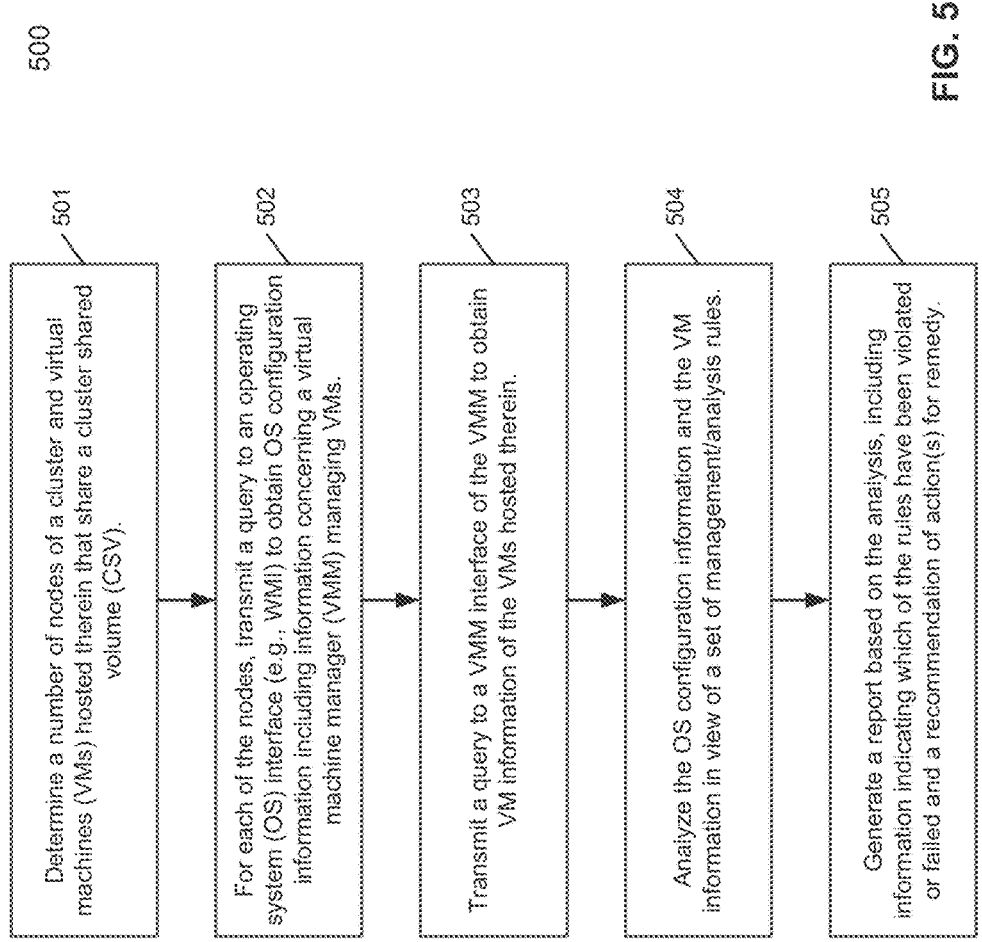
FIG. 5 is a flow diagram illustrating a process of collecting and analyzing configuration information according to one embodiment of the invention.

FIG. 5 is a flow diagram illustrating a process of analyzing configuration information collected from nodes of a cluster according to one embodiment of the invention. Process 500 may be performed by processing logic which may include software, hardware, or a combination thereof. For example, process 500 may be performed by configuration 165. Referring to FIG. 5, in operation 501, processing logic determines a number of nodes in a cluster and VMs in each node that share a cluster shared volume. In operation 502, for each of the nodes in the cluster, processing logic establishes a remote connection with an OS management interface (e.g., WMI) to query and obtain OS configuration information including information concerning a VMM hosted by the OS. In operation 503, processing logic establishes a remote connection with the VMM via a VMM API to query and obtain VM information of one or more VMs managed by the VMM. In operation 504, processing logic performs an analysis on the OS configuration information and VM information in view of a set of management or analysis rules to determine whether any of the rules has been violated. In operation 505, processing logic generates a report based on the analysis. The report indicates which of the rules has been violated or failed, and for each of the rules violated or failed, processing logic optionally provides a recommendation of an action to remedy the violation or failure. The recommendation of actions may be specified as part of the rules.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
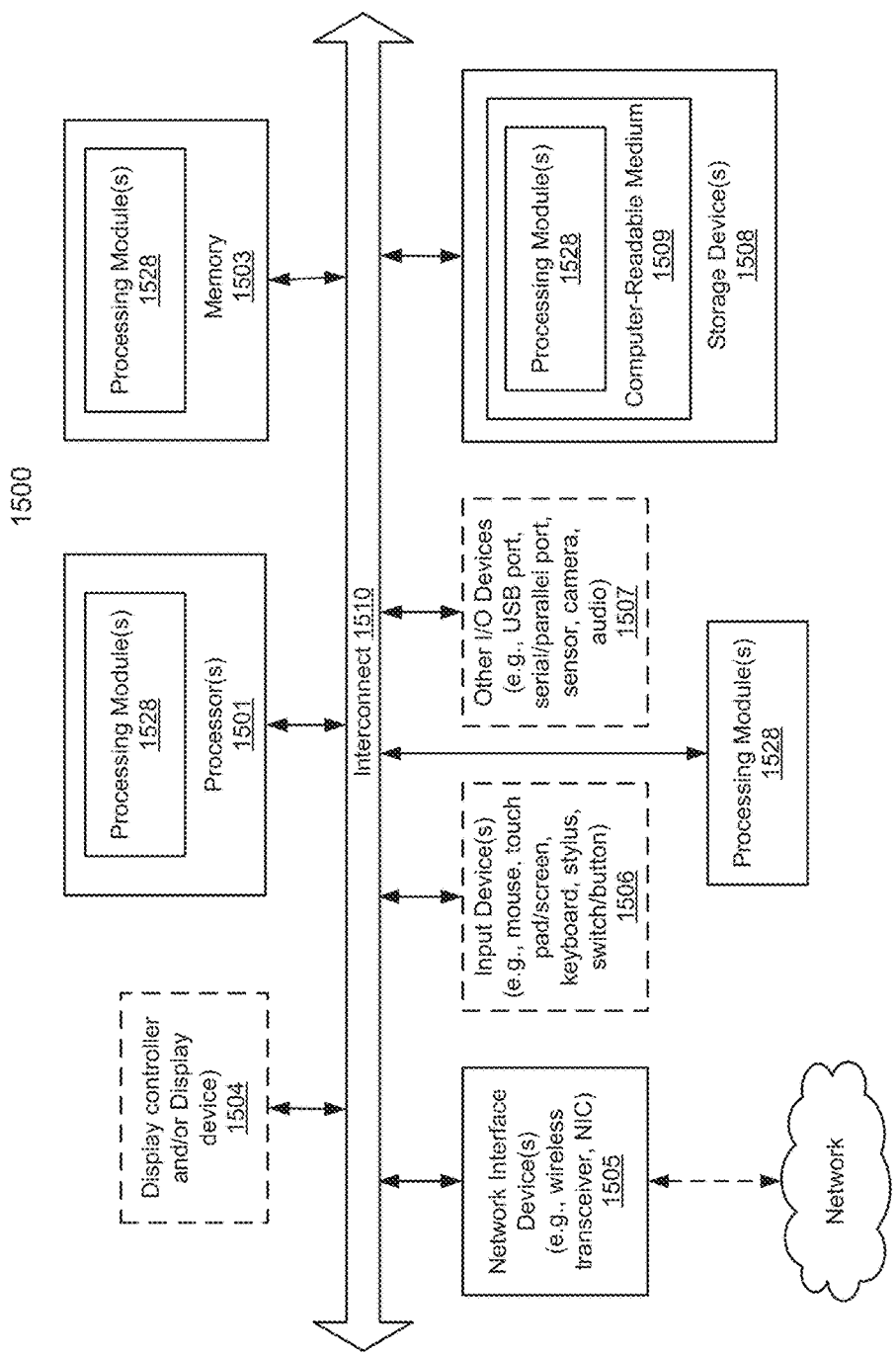
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above, such as, for example, clients 101-102 and storage system 105 of FIG. 1A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, configuration checker 165, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining operating status of a cluster of nodes, the method comprising:
    for each of a plurality of nodes of a cluster sharing a cluster shared volume (CSV),
        transmitting a first query to an operating system (OS) management interface of an operating system of the node to obtain OS configuration information concerning a VMM hosting one or more virtual machine (VMs) within the node, and
        transmitting a second query to a VMM interface of the VMM of the node to obtain VM information concerning each of the VMs hosted by the VMM in the node, wherein the VM information concerning each VM indicates whether the VM has been configured with a first particular type of disk, whether the VM shares a second particular type of disk with another VM, and whether the VM that has failed to create a check point due to a root directory of the CSV volume configured for the VM;
    performing an analysis on the OS configuration information and the VM information in view of a set of management rules; and
    generating a report based on the analysis, the report including information indicating which of the management rules has been violated.

2. The method of claim 1, wherein generating a report based on the analysis comprises
    determining one or more management rules that have been violated based on the OS configuration information and the VM information; and
    for each of the management rules that have been violated, determine a recommended action to remedy violations of the management rules.

3. The method of claim 2, wherein each of the management rules specifies a recommended action to be performed in the event that the management rule has been violated.

4. The method of claim 1, wherein the OS configuration information of a node indicates whether a VM management service is running within the node.

5. The method of claim 1, wherein the OS configuration information of a node indicates at least one of:
    an operating state of a volume shadow service (VSS) writer, or
    a clustered shared volume VSS writer running in the node.

6. The method of claim 1, wherein the VM information of a VM indicates at least one of:
    whether the VM has been configured with a pass-through disk,
    whether the VM shares a differential virtual hard disk with another VM,
    whether a VM integration service is running within the node, or
    whether a VM integration service has a version later than a predetermined version.

7. The method of claim 1, wherein the OS management interface is compatible with Windows Management Instrumentation™ (WMI), and wherein the VMM interface is compatible with Hyper-V PowerShell™ interface.

8. A non-transitory machine-readable medium having instructions stored therein, which when executed by a processor, cause the processor to perform operations, the operations comprising:
  for each of a plurality of nodes of a cluster sharing a cluster shared volume (CSV),
    transmitting a first query to an operating system (OS) management interface of an operating system of the node to obtain OS configuration information concerning a VMM hosting one or more virtual machine (VMs) within the node, and
    transmitting a second query to a VMM interface of the VMM of the node to obtain VM information concerning each of the VMs hosted by the VMM in the node, wherein the VM information concerning each VM indicates whether the VM has been configured with a first particular type of disk, whether the VM shares a second particular type of disk with another VM, and whether the VM that has failed to create a check point due to a root directory of the CSV volume configured for the VM;
  performing an analysis on the OS configuration information and the VM information in view of a set of management rules; and
  generating a report based on the analysis, the report including information indicating which of the management rules has been violated.

9. The machine-readable medium of claim 8, wherein generating a report based on the analysis comprises
  determining one or more management rules that have been violated based on the OS configuration information and the VM information; and
  for each of the management rules that have been violated, determine a recommended action to remedy violations of the management rules.

10. The machine-readable medium of claim 9, wherein each of the management rules specifies a recommended action to be performed in the event that the management rule has been violated.

11. The machine-readable medium of claim 8, wherein the OS configuration information of a node indicates whether a VM management service is running within the node.

12. The machine-readable medium of claim 8, wherein the OS configuration information of a node indicates at least one of:
  an operating state of a volume shadow service (VSS) writer, or
  a clustered shared volume VSS writer running in the node.

13. The machine-readable medium of claim 8, wherein the VM information of a VM indicates at least one of:
  whether the VM has been configured with a pass-through disk,
  whether the VM shares a differential virtual hard disk with another VM,
  whether a VM integration service is running within the node, or
  whether a VM integration service has a version later than a predetermined version.

14. The machine-readable medium of claim 8, wherein the OS management interface is compatible with Windows Management Instrumentation™ (WMI), and wherein the VMM interface is compatible with Hyper-V PowerShell™ interface.

15. A data processing system, comprising:
  a processor; and
  a memory coupled to the processor to store instructions, which executed by the processor, cause the processor to perform operations, the operations including
    for each of a plurality of nodes of a cluster sharing a cluster shared volume (CSV),
      transmitting a first query to an operating system (OS) management interface of an operating system of the node to obtain OS configuration information concerning a VMM hosting one or more virtual machine (VMs) within the node, and
      transmitting a second query to a VMM interface of the VMM of the node to obtain VM information concerning each of the VMs hosted by the VMM in the node, wherein the VM information concerning each VM indicates whether the VM has been configured with a first particular type of disk, whether the VM shares a second particular type of disk with another VM, and whether the VM that has failed to create a check point due to a root directory of the CSV volume configured for the VM,
    performing an analysis on the OS configuration information and the VM information in view of a set of management rules, and
    generating a report based on the analysis, the report including information indicating which of the management rules has been violated.

16. The system of claim 15, wherein generating a report based on the analysis comprises
  determining one or more management rules that have been violated based on the OS configuration information and the VM information; and
  for each of the management rules that have been violated, determine a recommended action to remedy violations of the management rules.

17. The system of claim 16, wherein each of the management rules specifies a recommended action to be performed in the event that the management rule has been violated.

18. The system of claim 15, wherein the OS configuration information of a node indicates whether a VM management service is running within the node.

19. The system of claim 15, wherein the OS configuration information of a node indicates at least one of:
  an operating state of a volume shadow service (VSS) writer, or
  a clustered shared volume VSS writer running in the node.

20. The system of claim 15, wherein the VM information of a VM indicates at least one of:
  whether the VM has been configured with a pass-through disk,
  whether the VM shares a differential virtual hard disk with another VM,
  whether a VM integration service is running within the node, or
  whether a VM integration service has a version later than a predetermined version.

21. The system of claim 15, wherein the OS management interface is compatible with Windows Management Instrumentation™ (WMI), and wherein the VMM interface is compatible with Hyper-V PowerShell™ interface.

* * * * *